United States Patent

Gretsky

[15] 3,664,392
[45] May 23, 1972

[54] LANE RESURFACER WITH CUTTER POSITION CONTROL ECCENTRICS

[72] Inventor: Anthony J. Gretsky, Muskegon, Mich.
[73] Assignee: Brunswick Corporation
[22] Filed: Dec. 23, 1969
[21] Appl. No.: 887,598

[52] U.S. Cl. .......................................... 144/117 C, 51/174
[51] Int. Cl. ......................................................... B27c 1/02
[58] Field of Search ............... 144/117, 117 C, 114; 51/174, 51/176

[56] References Cited

UNITED STATES PATENTS

| | | | |
|---|---|---|---|
| 2,655,770 | 10/1953 | Parovel | 51/174 |
| 3,217,347 | 11/1965 | Domecki | 51/176 X |
| 3,212,218 | 10/1965 | Sams et al. | 51/174 |
| 3,083,390 | 4/1963 | Wroten | 51/176 X |

*Primary Examiner*—Donald R. Schran
*Attorney*—Hofgren, Wegner, Allen, Stellman & McCord

[57] ABSTRACT

A lane resurfacer for a bowling lane having a carriage with a milling cutter mounted for rotation transversely thereof, there being provide a front skid for supporting the carriage and two laterally spaced rear skids, with means to vary the cutting depth as desired, and means to vary the inclination of the milling cutter in response to an automatic level detector, the cutting depth adjustments being effected by a first pair of eccentrics carrying the laterally spaced rear carriage skids, and the level adjustments being effected by a second pair of eccentrics mounting the cutter frame.

23 Claims, 13 Drawing Figures

Inventor
Anthony J. Gretzky
By Hofgren, Wegner,
Allen, Stellman & McCord
Atty's

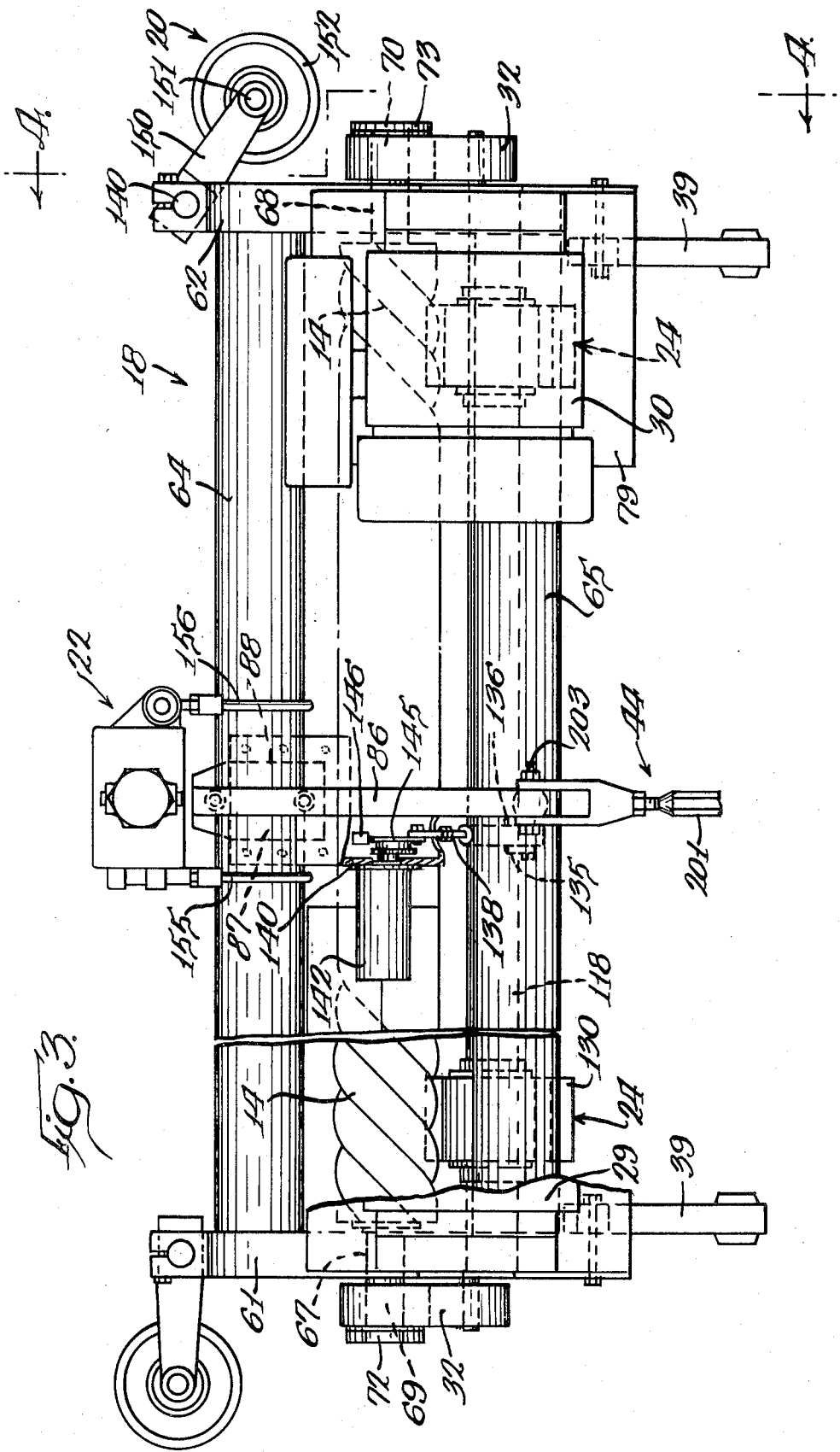

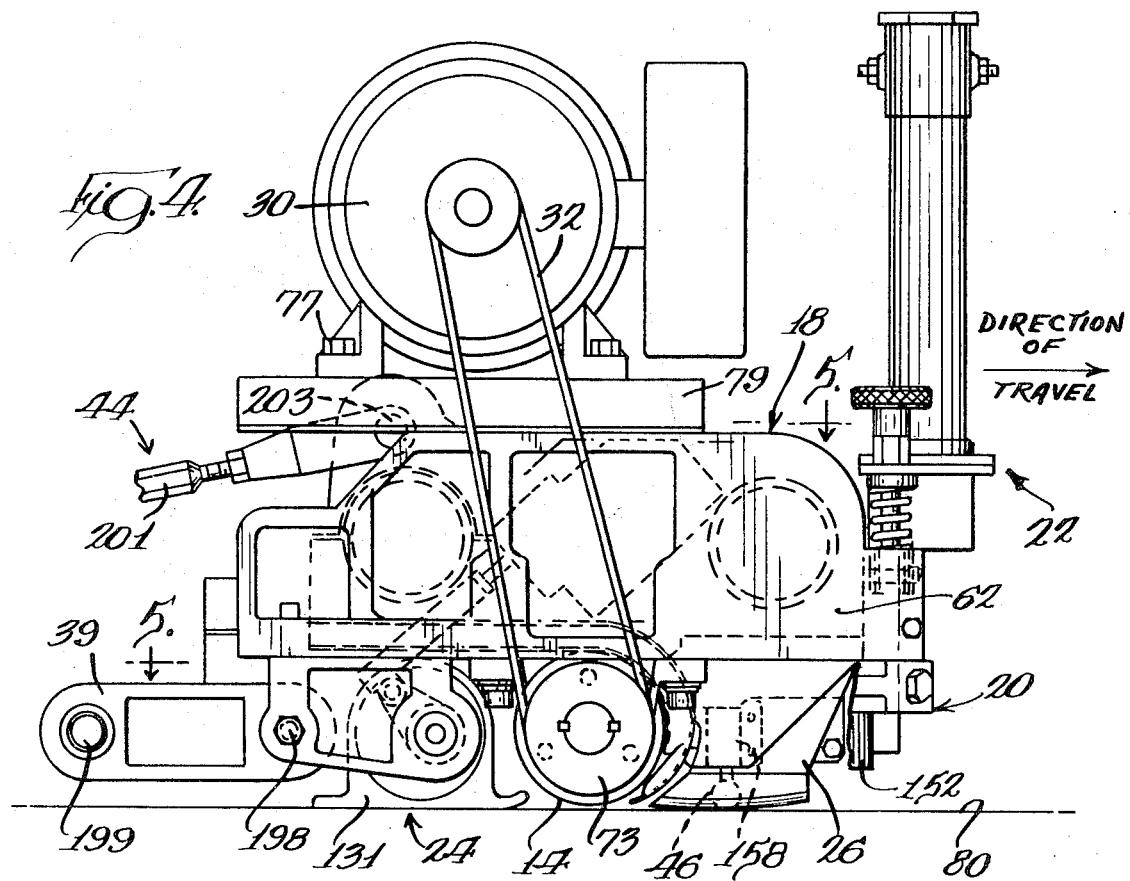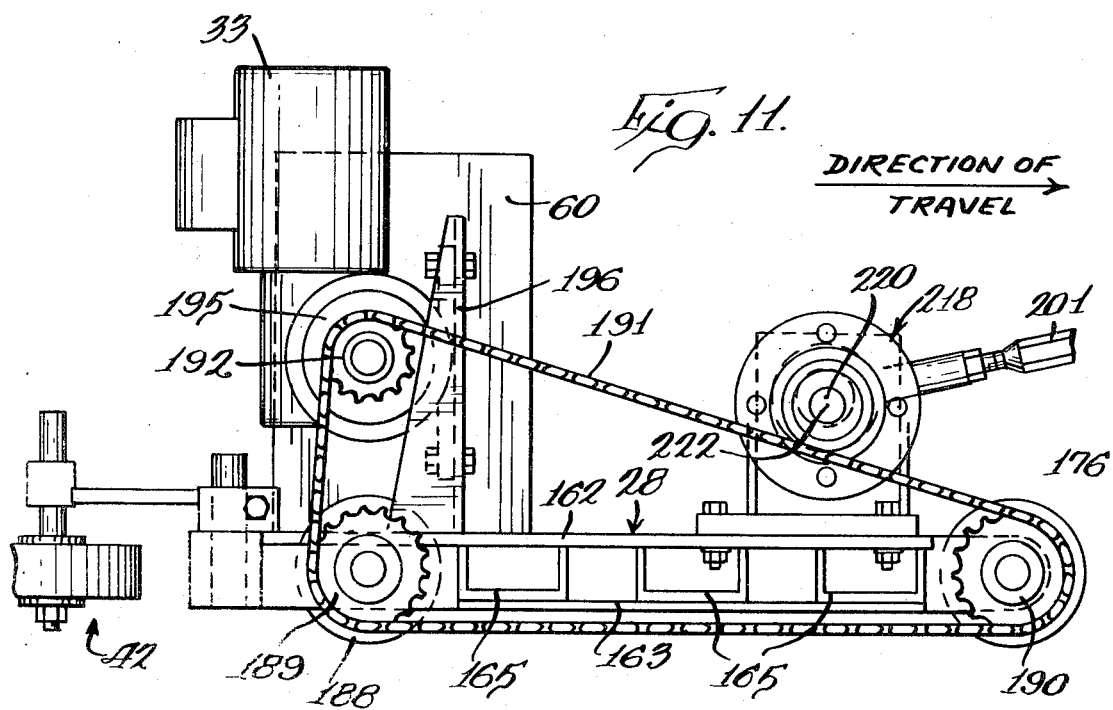

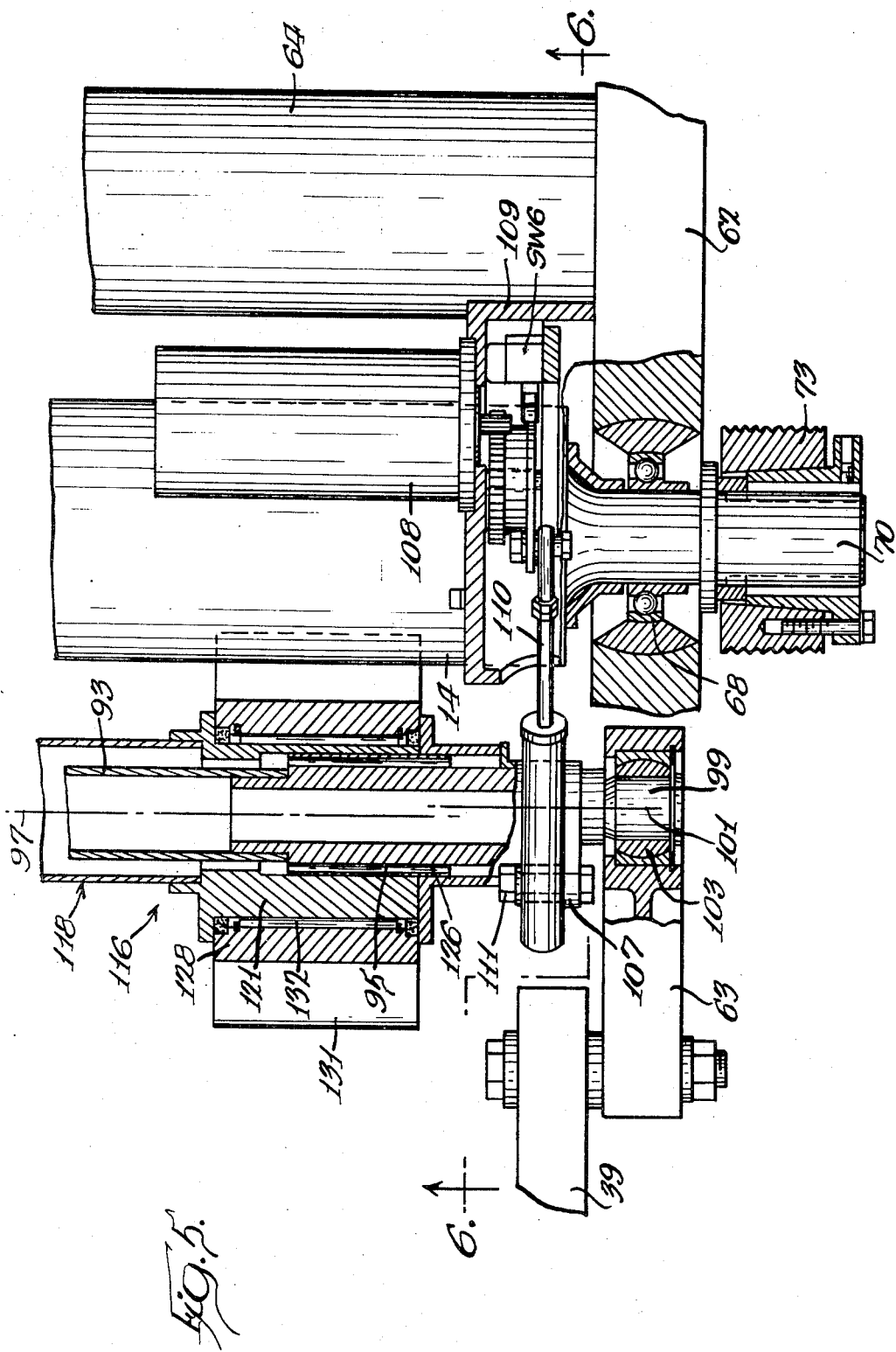

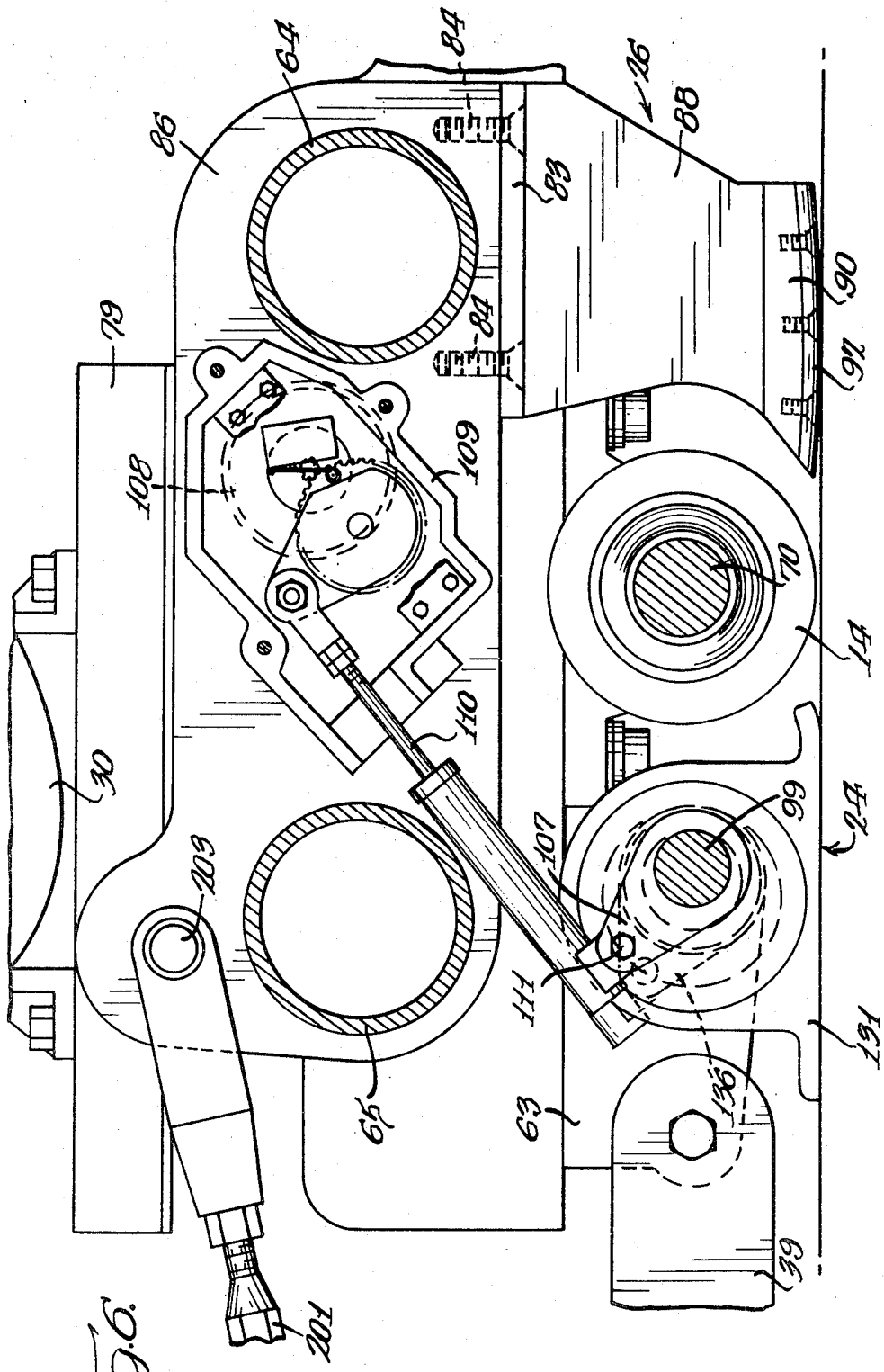

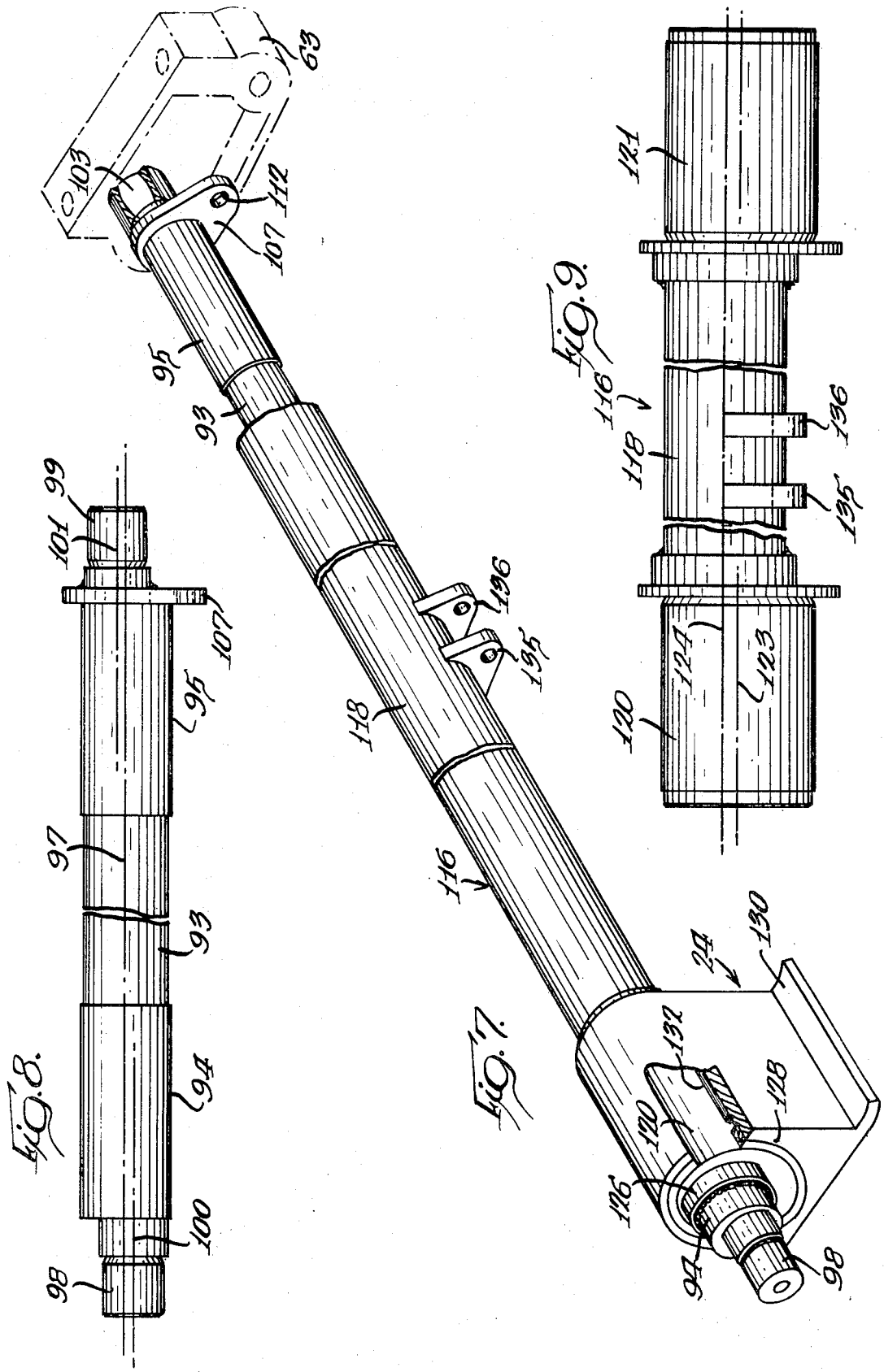

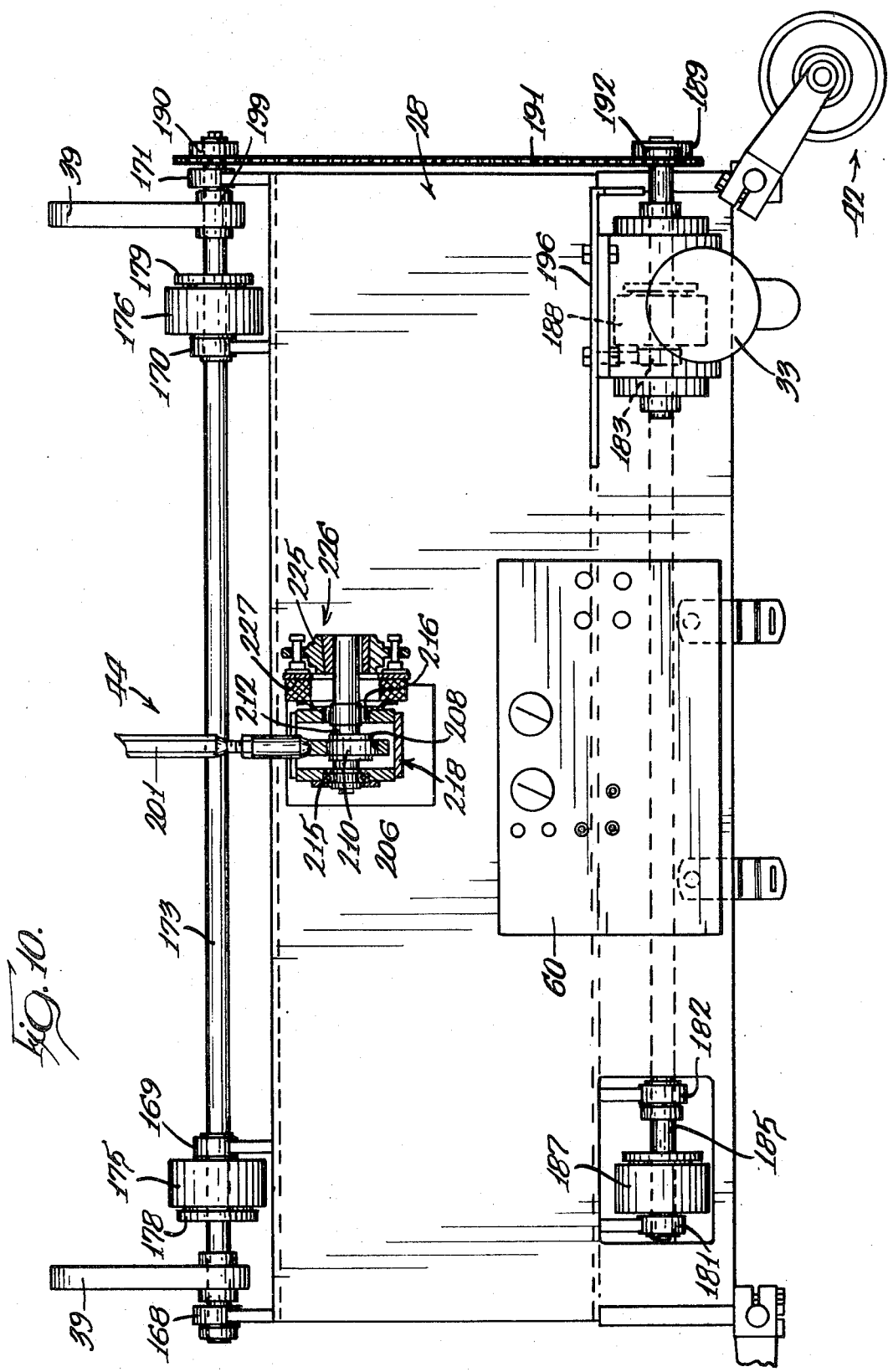

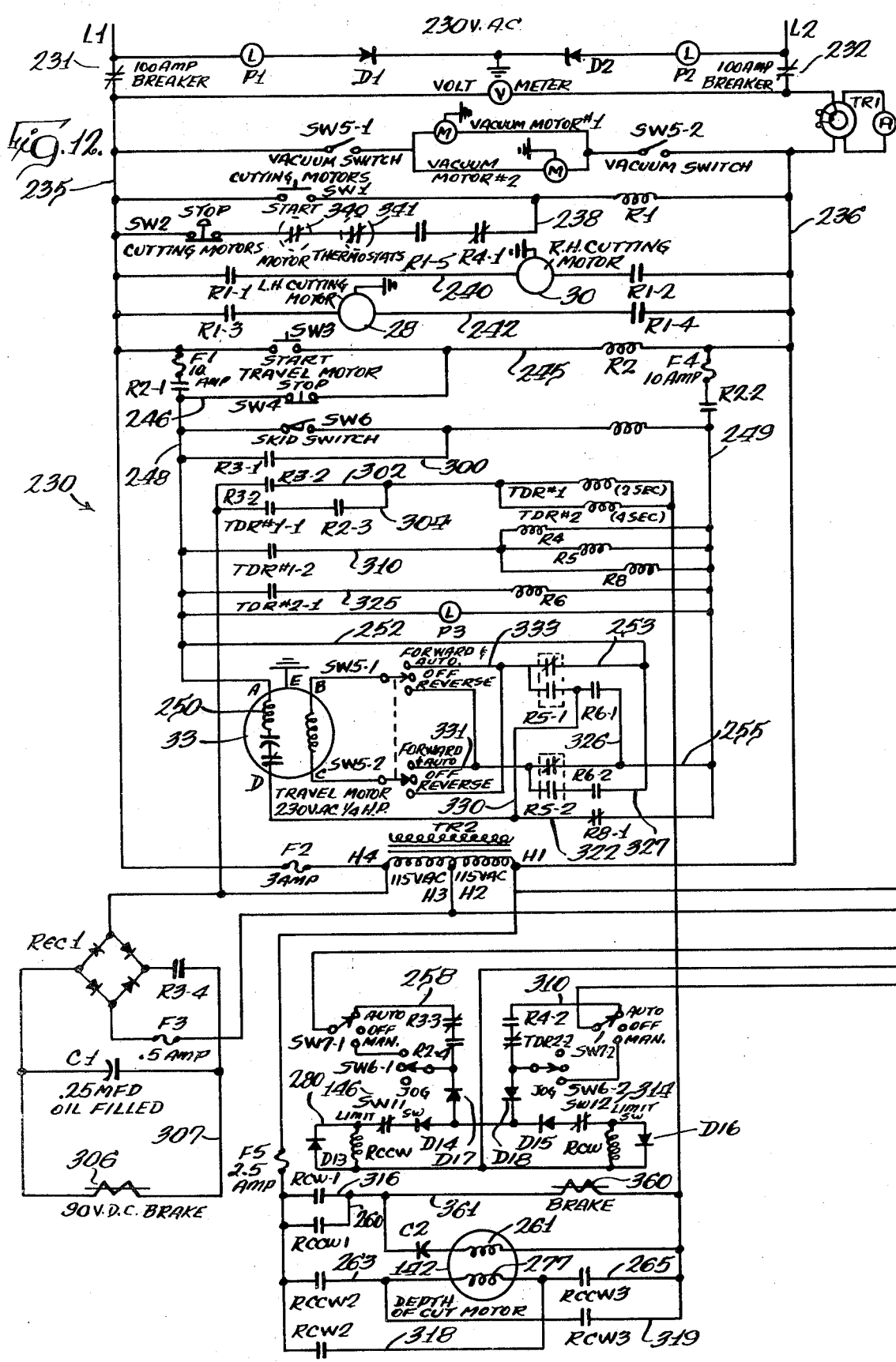

LANE RESURFACER WITH CUTTER POSITION CONTROL ECCENTRICS

BACKGROUND OF THE INVENTION

The basic disadvantages in prior art lane resurfacing devices is that (1) they fail to accurately resurface the bowling lane, and (2) they depend for their accuracy to a large extent on the dexterity of the operator using the resurfacing device.

In one general prior art type of resurfacing device, a carriage is supported from a pair of lane engaging wheels with a rotary sanding disc or belt suspended from the carriage at a point spaced from the wheels. A handle connected to the carriage permits the operator to pivot the carriage about the wheels and control the extent of resurfacing or sanding of the bowling lane. In this class of devices it is apparent that the resurfacing implement itself forms a portion of the support for the resurfacing carriage and thus it is impossible to accurately control the depth of cut of the resurfacing tool. The result of this is that even with an operator having good dexterity, the resurfacing device will produce a wavy finish on the lane surface which, of course, is undesirable.

Another class of prior art resurfacing devices provides supports for the resurfacing tool carriage spaced longitudinally of the lane. Some of these, for example, employ parallel spaced sets of wheels. The primary disadvantage of these prior art constructions is that they require a long wheelbase to support all the necessary equipment, and the long wheelbase detracts significantly from the cutting accuracy of the resurfacing tool in that any lane surface sensing means may be remote from the work device.

There have also been attempts to provide drive devices and controls for moving the lane resurfacer down the lane and returning it toward the foul line, but they have all required significant operator monitoring, adjustment and control during the machining cycle increasing the likelihood of manual error and detracting from the quality of the resurfacing job. More particularly, automatic level controls have been provided, but they produce excessive hunting of the resurfacing tool.

It is a primary object of the present invention to obviate the problems in the prior art set forth above.

SUMMARY OF THE PRESENT INVENTION

In accordance with the present invention, a completely automatic lane resurfacing device is provided that drives a rotating milling cutter down the lane to be resurfaced, automatically controlling the depth of cut of the tool as well as the level of the tool, holds the tool in position as it goes over the lane tail plank assuring accurate machining of the tail plank, raises the cutter at the pit end of the lane and returns the entire resurfacer towards the foul line without manipulation by a human operator.

There are provided independently mounted cutter and drive carriages interconnected by a linkage so that the drive carriage can push or pull the cutter carriage. Since the cutter carriage is independently mounted, the lane engaging supports for the cutter carriage may be spaced very close together on either side of a rotating milling cutter increasing the machining accuracy of the resurfacer.

To prevent the forward end of the cutter carriage from falling down into the pit as it passes thereover, which would result in increasing the depth of cut at the tail plank, a selective locking linkage is provided between the cutting carriage and the drive or travel unit to maintain the position of the cutter carriage as the rotating milling cutter passes over the lane tail plank.

Another advantage in providing independent carriages for the cutter assembly and for the drive assembly is that the cutter may be adjusted relative to the lane by controlling the position of the cutter carriage without affecting the position of the drive carriage, simplifying the cutter adjustment controls considerably.

The cutter depth as well as the cutter level is controlled by shifting the position of the cutter relative to spaced metal, lane engaging skids on the rear of the cutter carriage. This is effected by providing a shaft mounted within the rear end of the cutter carriage frame and carrying spaced eccentrics having a common geometric axis skewed with respect to the axis of the shaft, each supporting one of the skids so that upon rotation of this shaft one skid will move upwardly and the other will move downwardly relative to the carriage, altering the level of the milling cutter. The control for the level adjustment is automatic in response to a pendulum sensing device on the front of the cutter carriage. A novel variable dead band circuit is provided in the level control to minimize hunting. For the purpose of adjusting the depth of cut of the cutter a second pair of eccentrics is provided mounted over the first pair also having a common geometric axis but further having a common axis of rotation, so that upon rotating these eccentrics the spaced skids will move upwardly or downwardly together, relative to the carriage, causing both ends of the cutter to move down or up together to control the depth of the milling cutter in the lane to be resurfaced.

The controls for the resurfacing device are largely carried on a control console mounted on the drive carriage. Suitable control circuitry is provided for automatically lowering the cutter upon initiation of the resurfacer travel motor and stopping the cutter depth adjustment when the proper cutting depth is achieved. The level detecting circuitry automatically maintains the cutter level as the drive or travel carriage pushes the cutter carriage down the lane.

As the cutter carriage reaches the tail plank of the lane a switch on the forward cutter carriage skid opens, energizing control circuitry which locks the cutter carriage to the drive or travel carriage to prevent the rotating cutter from gouging the tail plank as the forward skid leaves the lane. Suitable time delay circuitry is provided to permit the travel unit to feed the cutter over the end of the tail plank prior to the automatic withdrawal of the cutter as well as to control the automatic reversal of the travel drive motors. The drive unit then begins pulling the cutter carriage back toward the foul line, completing the resurfacing cycle.

BRIEF DESCRIPTION OF THE DRAWINGS

FIG. 3 is a top plan view of the cutter carriage assembly;

FIG. 4 is a side view of the cutter carriage assembly;

FIG. 5 is a fragmentary top view of the cutter carriage assembly, partly in section, illustrating one of the rear skid adjusting mechanisms;

FIG. 6 is a cross section of the cutter carriage assembly taken generally along line 6—6 of FIG. 5 illustrating the cutter level actuator;

FIG. 7 is a perspective view of the rear skid mounting and control, with one skid omitted;

FIG. 8 is a top view of the cutter level control shaft;

FIG. 9 is an elevational view of the cutter height control shaft;

FIG. 10 is a plan view of the drive carriage;

FIG. 11 is a side view of the drive carriage; and

FIGS. 12 and 13 are schematic diagrams of the control circuit for the resurfacer.

DETAILED DESCRIPTION OF THE PREFERRED EMBODIMENT

Figure 1:
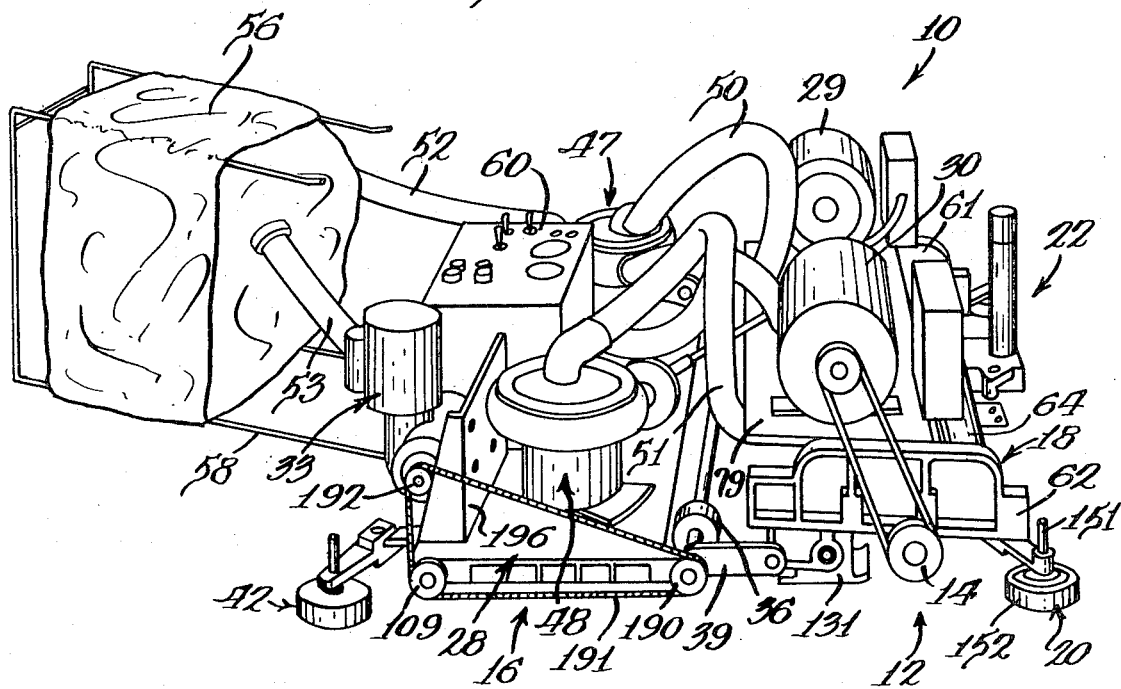
FIG. 1 is a perspective view of the present lane resurfacer.
Figure 2:
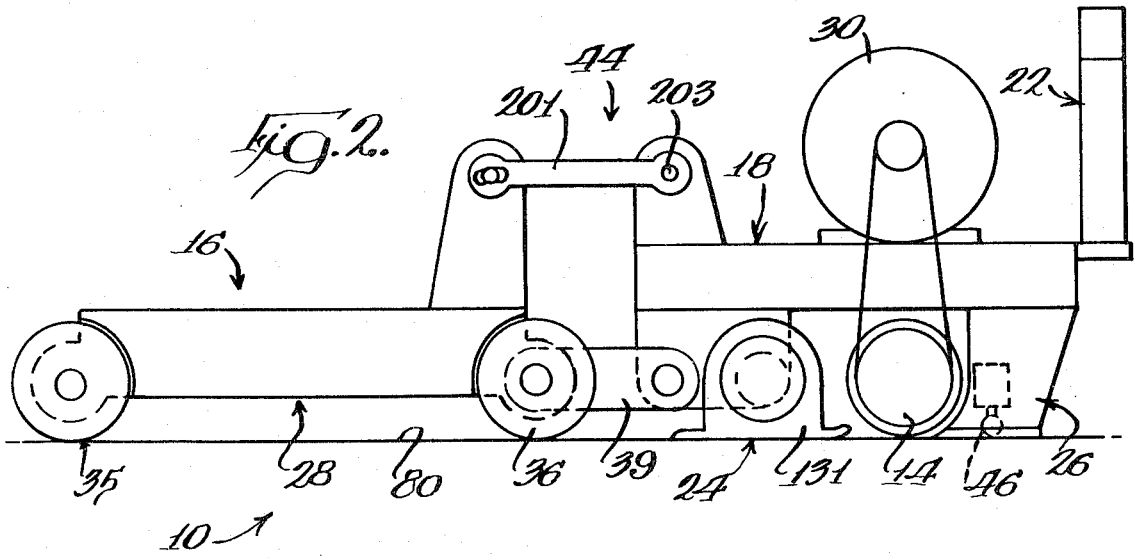
FIG. 2 is a schematic illustration of the resurfacer carriages with parts removed for clarity.

Referring to the drawings and particularly FIGS. 1 and 2, a lane resurfacing device 10 is illustrated consisting generally of a cutter carriage 12 having a rotary milling cutter 14, and an independently supported travel or drive carriage 16 which propels the cutter carriage 12 down the lane during resurfacing and pulls the cutter carriage back towards the foul line after resurfacing.

The cutter 14 is a helically bladed milling cutter mounted for rotation about a horizontal axis in a cutter carriage frame assembly 18. The frame 18 is guided laterally by guide roller assemblies 20 which ride against dividers associated conventionally with the sides of the lane. Mounted on the frame assembly 18 is a level detector 22, which controls the position of the cutter 14 by shifting spaced rear skid assemblies 24 upwardly or downwardly with respect to the frame assembly 18 pivoting the cutter 14 about a forward skid 26 which also slides on the surface of the lane.

Cutter drive motors 29 and 30 are carried by the frame assembly 18 and are connected by belts 32 to drive the ends of the cutter, two motors being provided to give a balanced drive to the cutting tool.

The drive carriage 16 includes a frame assembly 28 that carries a drive motor 33 for propelling four friction drive wheels 35 and 36. The drive wheels 35 and 36 have a relatively high coefficient of friction so that the skids 24 and 26 may be constructed of metal, increasing the machining accuracy of the cutter 14 since there is no resiliency in the support for the cutter frame 18.

The drive or travel carriage 16 is pivotally connected to the cutter frame 18 by two spaced links 39 that permit the cutter frame to pivot freely with respect to the drive unit 16.

Guide roller assemblies 42 are provided on the rear corners of the drive carriage 16 for the purpose of engaging the adjacent lane dividers in the same manner as guide roller assemblies 20 on the front of the cutter carriage 12.

For the purpose of locking the cutter carriage frame to the drive unit 16 as the front skid 26 passes over the tail plank adjacent the pit, a selective locking linkage 44 is provided that is automatically actuable in response to a switch 46 which senses the end of the lane at the tail plank to hold the cutter carriage 12 in its last vertical position without the support of the front skid 26.

Also carried on the drive carriage 16 are vacuum units 47 and 48 which have flexible conduits 50 and 51 communicating with the interior of the cutter frame 18 adjacent the cutter 14 for the purpose of removing wood dust and chips therefrom and delivering them through additional conduits 52 and 53, respectively, to a canvas chip container 56 carried by a frame assembly 58 from the drive or travel carriage 16.

The control console 60 is also supported on the drive carriage frame 28.

Referring to FIGS. 1, 3, 4, 5 and 6 for a more detailed description of the cutter carriage assembly 12, frame 18 is seen to include cast metal, side frame members 61 and 62, held together by a front frame spacer member 64 and a rear frame spacer member 65 as seen clearly in FIGS. 3 and 5.

The cutter 14 is rotatably supported about a fixed axis with respect to frame assembly 18 in spaced bearings 67 and 68 in the side frame members 61 and 62, respectively. The cutter 14 has reduced end portions 69 and 70 which extend through the frame members 61 and 62, respectively, that receive drive pulleys 72 and 73. The drive pulleys 72 and 73 are driven by belts 32 from the cutter motors 29 and 30. As seen in FIGS. 1 and 4, the cutter motors 29 and 30 are mounted by suitable fasteners 77 on a horizontally extending plate 79 connected between the frame members 61 and 62 at the upper portions thereof. Thus, it should be understood that there is no relative movement (except rotation) between the cutter 14 and the frame assembly 18, and the cutter height and level adjustment is effected by controlling the position of the entire frame assembly 18 with respect to the lane 80 through adjustment of the rear skid assemblies 24.

The front skid assembly 26 is carried approximately centrally on the front frame member 64 and includes a frame plate 83 connected by suitable fasteners 84 as shown in FIG. 6 to a vertically extending frame member 86 surrounding and connected to both the forward and rear frame members 64 and 65. Fixed to the plate 83 are spaced downwardly projecting plates 87 and 88 that have laterally extending flanges 90 fixed to a metal lane engaging skid shoe 92. The lower surface of the skid shoe is curved on a large radius both in the plane of FIG. 6 as well as transverse to the plane of FIG. 6 so that the entire carriage frame 18 may be pivoted about the surface of shoe 92 in both directions to effect both cutter height adjustment as well as cutter level adjustment.

The skid assemblies 24 are provided for pivoting the cutter carriage frame 18 on the forward skid shoe 92 to adjust the position of the cutter 14 with respect to the lane surface 80, and also for the purpose of supporting the cutter carriage 12. As will appear hereinbelow, the skid assemblies 24 consist basically of four eccentrics that mount the skid assemblies and adjust them vertically with respect to the cutter frame assembly 18 to selectively and vertically adjust the position of the cutter frame 18 and the cutter 14 as desired.

As shown in FIGS. 5 and 8, the rear skid assemblies 24 include a level adjusting shaft 93 having spaced concentric bearing lands 94 and 95 carried thereby having a common geometric axis 97 with shaft 93. Carried by the shaft 93 are shaft projections 98 and 99 having eccentric axes 100 and 101 spaced a predetermined equal distance on the opposite sides of axis 97. The axes 97, 100 and 101 lie in a common plane so that the shaft portions 98 and 99 may be considered to be 180° out of phase.

As seen more clearly in FIGS. 5 and 7, the shaft portions 98 and 99 are received in spherical bearing assemblies 103 in the side frame members 61 and 62, respectively. Since the level control assembly shown in FIG. 8 is a rigid unit, its rotation in bearing assemblies 103 defines an axis of variable inclination skewed with respect to the axis 97 and extending from the center of spherical bearing 103 at one side of the cutter frame to the center of the similar bearing at the opposite side of the frame.

In the neutral position of the level control assembly the plane defined by the axes 97, 100 and 101 is horizontal. Upon rotation of shaft 93 in one direction, eccentric 98 will rotate above axis 97 and eccentric 99 will rotate below axis 97 lowering the right end of the cutter frame 24 as viewed in FIG. 3 and raising the left end of the cutter frame thereby lowering the right end of cutter 14 and raising the left end.

For the purpose of rotating the level control eccentrics 98, 99, a bracket 107 is fixed to and projects from the shaft portion 99 as seen in FIGS. 7 and 8. To shift the bracket 107, a level control motor 108 is provided fixed to a gear box assembly 109 carried on the inside of frame member 62 as shown in FIG. 5. The gear box 109 drives an adjustable link 110 fixed by suitable fastener 111 to an aperture 112 in the bracket 107. The motor 108 when actuated drives the bracket 107 either upwardly or downwardly to rotate the eccentrics 98, 99, to effect level control of the carriage frame 18. The level control motor 108 is controlled by the pendulum level detector 22.

To adjust the skid assemblies 24 in a manner to control the height and depth of cut of cutter 14, a depth of cut sleeve assembly 116 is provided as shown in FIGS. 5, 7 and 9, and mounted on shaft 93. Viewing FIG. 9, the cutter height adjustment assembly is seen to include a central elongated sleeve 118 which carries eccentrics 120 and 121 at opposite ends thereof. The eccentrics 120 and 121 have a common geometric axis 123 offset from an axis of rotation 124 which is concentric with central sleeve 118. The eccentrics 120 and 121 include inner bearing surfaces rotatable on the bearing lands 94 and 95, through the intermediary of a sleeve bearing assembly 126 shown in FIG. 7, so that the axis of rotation 124 of the level control assembly 116 is coincident with the geometric axis 97 of the bearings 94 and 95. Each of the eccentrics 120 and 121 has sleeves 128 about the periphery thereof which carry skid shoes 130 and 131, respectively, which are rotatably mounted as by bearings 132. Thus, it may be seen since the eccentrics 120 and 121 have a common axis of rotation 124 as well as a common geometric axis 123 spaced therefrom that they will move upwardly and downwardly simultaneously upon rotation of shaft 118 about axis 124. If the shaft 118 is rotated in a sense to raise the eccentrics 120 and 121, the shoes 130 and 131 associated therewith will be raised relative to the cutter frame, in effect lowering the rear end of the cutter frame 18 and lowering the cutter 14 toward the surface of the lane 80. Conversely, upon rotation of the shaft 118 in a direction to lower the eccentrics 120 and 121, the shoes 130 and 131 will be lowered relative to the frame, in effect raising the rear end of the cutter carriage assembly frame 18 and raising the cutter 14.

For the purpose of rotating the cutter height control assembly 116, a pair of spaced brackets 135 and 136 are provided approximately centrally on central sleeve 118. Connected to the pivotal brackets 135 and 136 is a linkage assembly 138 as shown in FIG. 3 connected to a gear box 140 driven by a depth of cut motor 142. The gear box and depth of cut motor 142 are similar in configuration to gear box 109 and motor 108 associated with the level control drive. The gear box 140 is fixed to the central frame member 86.

To control the depth of cut, a cam 145 is provided in gear box 140 which actuates a limit switch 146 to determine the lowermost position of the cutter 14. An additional limit switch, actuated by cam 145, may be provided to determine the uppermost or retracted position of the cutter 14 as will appear hereinbelow. It should be noted with respect to FIGS. 5 and 7 that the cutter adjustment of the cutter height eccentric assembly 116 does not extend to the side frame 62, but leaves space permitting the bracket 107 for the level control to be accessible to linkage 110 as shown in FIG. 5. Thus, the level control shaft portions 98 and 99 carry the entire skid assemblies 24 including cutter adjustment assembly 116 and skid shoes 130 and 131.

As shown more clearly in FIG. 3, the guide roller assemblies 20 at the front corners of the cutter frame 18 include vertical shafts 148 adjustably received in the forward ends of the frame member 61 and 62. Carried by each of the shafts 148 is a horizontally extending arm 150 which slidably receives another vertical shaft 151 (FIG. 1) supporting guide roller 152 for rotation in a horizontal plane. Shaft 151 is adjustable in bracket 150 so that it may be positioned in the proper position engaging the outside vertical surface of the adjacent lane divider or gutter so that with both of the roller guide assemblies 20 engaging the adjacent lane structure, the cutter carriage is guided laterally as it moves down the bowling lane.

The level detector 22 for carriage 16 is fixed by U-bolts 155 and 156 as shown in FIG. 3 to the front frame member 64. The level detector 22 is of the pendulum type and reference should be made to the Winkler et al. U.S. Pat. No. 2,688,217, assigned to the assignee of the present invention for a more detailed description of the mechanical components thereof. As shown in FIG. 4, suitable chip deflectors 158 are provided on each side of the central skid assembly 26 to deflect chips and dust towards the vacuum returns.

As noted above, the travel or drive carriage 16 is mounted for movement independently on the lane surface and is adapted to drive the cutter carriage 12 back and forth along the surface of the lane 80. As seen best in FIGS. 1, 10 and 11, the drive unit frame 28 is generally rectangular and consists of a rectangular flat upper plate 162 and a lower plate 163 separated therefrom by transversely extending channel members 165 fixed to both of the upper and lower plates. As shown best in FIG. 10, bosses 168, 169, 170 and 171 are provided on arms projecting from the plates 162 and 163, and carry aligned bearings for receiving a forwardly located drive shaft 173. Rotatably fixed to the drive shaft are spaced high friction rollers 175 and 176 defining the wheels 36 and restrained from axial movement along shaft 173 by rings 178 and 179, respectively.

Similar bosses 181, 182, etc., are provided on arms projecting from the rear of the frame assembly 28 and rotatably support a rear drive shaft 185. Fixed to the rear drive shaft 185 are rear drive rollers 187 and 188 defining wheels 35 as shown in FIG. 2 of the same construction as the front drive unit wheels 175 and 176.

To drive the shafts 173 and 185 in unison and propel the drive unit 16, the shafts are provided with sprockets 189 and 190 as shown in FIG. 11 drivingly connected to an endless chain 191 driven by a sprocket 192.

The sprocket 192 projects from and is driven by a gear box 195 supported on a generally vertically extending bracket 196 fixed to the upper plate 162 of the frame assembly as shown in FIG. 11. Travel motor 33 is carried by the gear box 195 and is controlled by the control console 60 which is also carried by the frame assembly 28.

The roller guide assemblies 42 project from each of the rear corners of the drive or travel unit 16 and are identical in construction to the guide roller assemblies 20 at the forward corners of the cutter frame 18. Roller assemblies 42 serve to guide the rear end of the drive unit 16 and since the drive unit 16 is connected, at least in a lateral sense, with respect to the cutter frame 18, the entire resurfacing apparatus 10 is guided laterally as it moves down the lane.

As described briefly above, the drive unit 16 is connected to push and pull the cutter unit 12 but each is independently mounted and the cutter unit 12 is permitted limited pivotal movement about either a horizontal longitudinal axis or a horizontal transverse axis with respect to the drive unit 16 to permit the necessary cutter adjustments without disturbing the tractive position of the drive unit.

Toward this end, short links 39 are provided as shown in FIGS. 1, 2, 4 and 10 pivotally connected as at 198 to the cutter frame side members 61, 62 and at their other ends as indicated at 199 to the forward drive shaft 173 of the drive unit 16. As shown in FIG. 10, there is one link 39 provided at each end of the drive shaft 173 and they are connected respectively to the inside of the rear lower ends of the frame members 61, 62.

While the cutter carriage 12 is normally permitted pivotal movement with respect to the drive unit 16 as the latter drives the cutter unit down the lane, means are provided for locking the cutter unit to the drive unit in a manner to prevent independent pivotal movement of the cutter unit about a transverse horizontal axis. The purpose of this is that when the forward guide shoe assembly 26 passes over the tail plank at the end of the lane, normal support of the cutter carriage frame 18 is lost and the cutter 14 would drop since the links 39 do not by themselves prevent such movement. To maintain the pitch of the cutter assembly when the forward shoe assembly 26 leaves the lane, the locking linkage assembly 44 is provided. Locking assembly 44 effectively "grabs" frame member 86 preventing the forward tilting movement of the carriage 16 from the last set position of the carriage prior to movement of the shoe assembly 26 off the end of the lane over the pit.

Toward this end the cutter carriage locking assembly 44 consists of an adjustable link 201 pivotally connected as at 203 to the central frame member 86 of the cutter carriage frame 18. The rearward end of link 201 carries a boss 206 having a cylindrical inner surface 208 mounted on an eccentric 210. The eccentric 210 is carried by a shaft 212 mounted in bearings 215 and 216 in a frame assembly 218 mounted on the upper plate 162 of the drive unit frame 28. As may be seen in FIG. 11, the geometric axis 220 of eccentric 210 is normally above and somewhat to the rear of axis of rotation 222 of shaft 212. Because of this the link 201 may, so long as shaft 212 is free, shift forwardly and backwardly a limited distance, rotating shaft 212 in bearings 215 and 216. As seen in FIG. 10, a brake assembly 225 is provided for locking shaft 212 in any desired rotative position thereof. Brake 225 is an axially slidable disc brake having a rotating portion 226 carried by shaft 212 and a stationary portion 227 which are urged together upon actuation of the brake 225 to lock shaft 212 and eccentric 210 in the last position thereof. Thus, as the shoe assembly 26 approaches the end of the lane, it will position eccentric 210 and shaft 212 in a certain position and in response to release of switch 46 at the tail plank, brake 225 is actuated, clamping the eccentric 210 in its last position along with link 201 thereby holding the carriage frame 18 from pivotal movement just prior to and after the time the forward skid 26 leaves the lane surface.

Figure 13:
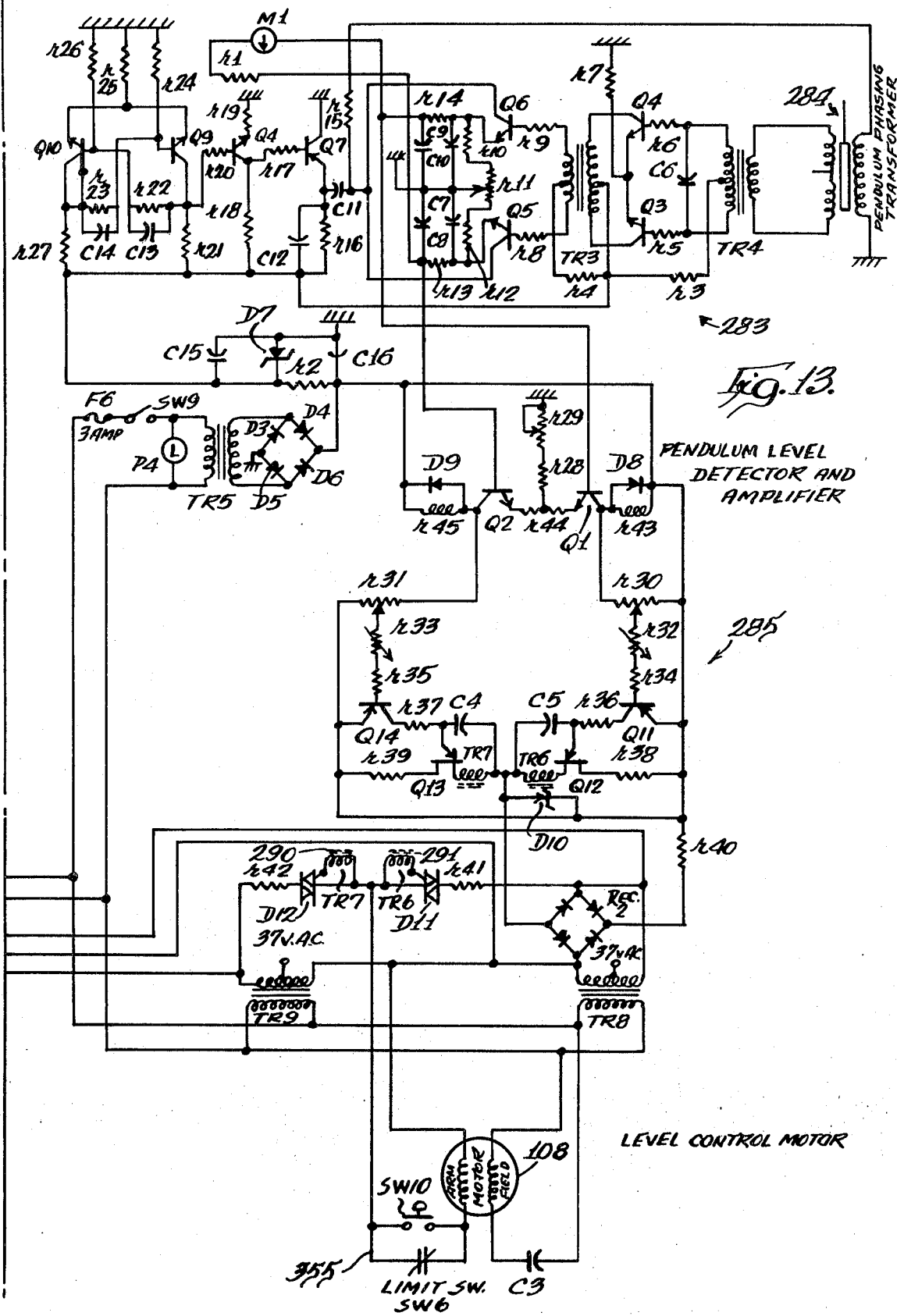

A control circuit shown in FIGS. 12 and 13 is provided in the control console 60 for the purpose of automatically controlling the complete cycle of operation of the lane resurfacer 10. Generally, the purpose of the control circuit is to initiate operation of the drive carriage to drive the cutter unit 12 down the lane, lower the cutter 14 to the proper cutting depth, automatically maintain the proper level of the cutter 14 during cutting, actuate brake 225 automatically as the cutter forward skid 26 approaches the end of the lane, raise the cutter 14 after the tail plank has been completely resurfaced, turn off the cutting motors 28 and 30 and then reverse the drive motor 33 so that the drive unit 16 pulls the cutter carriage 12 back toward the foul line.

Toward this end control circuit 230 is provided with a 230 volt AC source and two 100 amp circuit breakers 231 and 232 in lines 235 and 236, respectively. Connected across the lines 235 and 236 are manually operable switches SW5—1 and SW5—2 for the purpose of actuating the vacuum motors associated with the vacuum assemblies 47 and 48 shown in FIG. 1.

To initiate operation of the resurfacer, switch SW1 is manually closed energizing relay R1, closing contacts R1—5 in holding line 240 maintaining relay R1 energized permitting the operator to release switch SW1. With the energization of relay R1, contacts are R1—1 and R1—2 in line 240 and contacts R1—3 and R1—4 in line 242 energize respectively, cutting motors 29 and 30.

The cutter motors thus begin driving the cutter 14 at the foul line end of the lane and let it be assumed that the cutter 14 is in its retracted position.

To initiate travel of the drive unit 16, switch SW3 in line 245 is closed energizing relay R2 which closes normally open contacts R2—1 in holding line 246 maintaining relay R2 energized. With the resulting closure of normally open contacts R2—1 and R2—2, lines 248 and 249 become energized activating a start winding 250 in the travel motor 33.

Current is supplied to the run winding 251 of travel motor 33 through lines 252, 253, normally closed contacts R5—1 across switch SW5—1 (assuming it is in the forward and automatic position), through winding 251 and line 255.

Now assuming the automatic depth control switch SW7 to be placed in the automatic position, the energization of relay R2 will close contacts R2—4 in line 258 energizing coil RCCW across diodes D17 and D14 and normally closed limit switch 146. With the energization of relay RCCW, contacts RCCW1 in line 260 energize winding 261 in depth of cut motor 142, and contacts RCCW2 in line 263 and RCCW3 in line 265 energize winding 277 to rotate motor 142 in a direction to lower the rear end of the drive carriage 12 and the cutter 14 until cam 145 actuates switch 146 shown in FIG. 3 as well as in line 280 in FIG. 12. Switch 146 is positioned so that the cutter 14 will be set at the proper cutting depth, e.g., 0.050 inches. When the depth of cut motor 142 is deenergized brake solenoid 360 in line 361 is deenergized actuating a brake (not shown) which locks the depth of cut motor 142 in position to maintain the desired depth of cut.

The cutter 14 is thus rotating at its proper cutting depth at this time while travel motor 33 is driving the drive unit and the cutter assembly down the lane guided laterally by guide roller assemblies 20 and 42.

For controlling the level of cutter 14, a pendulum level circuit 283 is provided as shown in FIG. 13. Circuit 283 is controlled by pendulum phasing transformer 284 in level detector 22. The pendulum level detector circuit 283 is disclosed in the Winkler et al. U.S. Pat. No. 2,688,217, referred to above. An out-of-level signal from the pendulum level circuit 283 drives the level control motor 108 in a sense to return the cutter frame 18 to a level position. Toward this end, the pendulum level detector circuit 283 provides an output current through one of the resistors r43 or r45 in direct proportion to the degree of out-of-level detected by the pendulum. The signal DC voltage from r43 or r45 is fed into a sensitivity control circuit 285 so that the voltage level can be established to drive the motor 108. The sensitivity control circuit permits an increased dead band area as the sensitivity is reduced by variable resistors r32 and r33.

A pendulum in detector 22 is connected to an iron core 284 movable within a transformer having a primary winding coupled to an AC oscillator formed by transistors Q7, Q8, Q9 and Q10. When the core 284 is exactly in its center position, equal and opposite phase outputs are developed from a pair of secondary windings, which phases cancel in the primary winding of a transformer TR4, and thus produce no driving signal to the remaining portion of the level detector.

Transformer TR4 is connected in a known type differential amplifying circuit 283 which develops DC voltages across capacitors C8 and C10 in direct proportion to the distance core 284 is located off-center. When the core is off-center in one direction, a DC voltage of positive polarity is developed across capacitor C10, and when the core is off-center in the opposite direction, a DC voltage of positive polarity is developed across the capacitor C8. The amplitude of either DC signal is directly proportional to the distance the core is off-center.

To provide a visual indication of the level of the frame, a bipolar ammeter M1 is connected across capacitors C10 and C8, and is responsive to the difference in polarity thereacross. The resulting meter movement is in a direction from a zero position which corresponds to the tilt of the frame, and moves an absolute distance off-center proportional to the amount of tilt.

To automatically control motor 108 in order to return the frame to the proper level, the DC signals across capacitors C8 and C10 are coupled to a servomechanism amplifier 285 which controls a pair of pulse actuated gating devices, such as triacs D11 and D12. The triacs control the portion and the phase of which is gated to the armature winding of motor 108. As will appear, the deadband of the servomechanism amplifier 285 is controllable by potentiometers r31, r33 and r30, r32 in order to establish the distance core 284 must be driven off-center before the motor 108 is driven in a particular direction to compensate for the core movement.

Motor 108 has a field winding which is coupled through a capacitor C3 across a single phase AC voltage source, and a motor armature coil which is connected to the AC source through triacs D11 or D12. Triac D11 is connected to the AC source through a transformer TR8, whereas triac D12 is connected through a transformer TR9, the primary winding of which is cross connected to the AC source. As a result, the secondary of transformer TR9 has an AC voltage which is 180° out of phase with the AC voltage at the secondary of transformer TR8. When triac D12 is gated on by a pulse from its pulse transformer TR7, it passes a portion of the 180° shifted AC waveform to the motor armature, causing the motor to rotate in one direction. Alternatively, when triac D11 is gated on by a pulse from its pulse transformer TR6, it passes a portion of the AC waveform to the motor armature, causing the motor to rotate in the other direction. The phase or firing angle for gating on the triacs determines the position of AC waveform coupled therethrough, and hence controls the speed of rotation of the armature.

Servomechanism amplifier 285 consists of a pair of channels, only one of which is effective at any instant of time to vary the firing angle for its triac D11 or D12. One channel is responsive to the potential across capacitor C8 to control transistors Q2 and Q14 in order to vary the frequency of oscillation of a unijunction oscillator including a unijunction transistor Q13. This in turn controls the time at which pulses are coupled to transformer TR7, thereby controlling the firing angle of triac D12. The other channel, in response to the potential across capacitor C10, varies the conduction of transistors Q1 and Q11 to control the frequency of oscillation of a unijunction oscillator including a unijunction transistor Q12. This controls the time of generation of pulses coupled to transformer TR6 in order to control the firing angle of triac D11. For clarity, the operation of only one of the channels will be explained in detail, it being understood that the other channel operates in a similar manner.

As the signal across capacitor C8 becomes more positive, transistor Q2 forming the first stage of the channel for triac D12 is more forwardly biased, causing more current to flow through resistor R45 and conducting transistor Q2 to drop towards ground potential, decreasing the positive voltage coupled to potentiometer R31. The decreasing voltage, coupled through resistors R31, R33 and R35 to the base of transistor Q14, reduces the positive potential at the base of transistor Q14, thereby tending to forward bias its emitter-base junction. This lowers its internal resistance and causes more current to be coupled through transistor Q14 and a resistor R37 to a capacitor C4, causing the capacitor to charge more rapidly.

Capacitor C4 is connected in a relaxation oscillator circuit, in which the unijunction transistor Q13 triggers or fires when the potential across the capacitor C4 (connected to the Q13 emitter and base-one electrodes) reaches a predetermined percentage of the voltage across the pair of bases of unijunction transistor Q13, which are connected separately through resistor R37 and the coil of transformer TR7 to a source of full-wave rectified AC potential from REC 2, which is clipped by Zener diode D10.

When transistor Q13 is fired, it discharges capacitor C4 through pulse transformer TR7, thereby coupling a pulse to triac D12 in order to gate the triac into a conducting state so that a portion of AC is passed to the armature coil. The magnitude of the signal from capacitor C8, depending on the settings of potentiometers R31 and R33 as will appear, controls the amount of forward biasing of transistor Q14, thereby controlling the RC time constant of the charging circuit for capacitor C4. If the signal magnitude increases, the resistance of transistor Q14 decreases, causing capacitor C4 to charge more rapidly, and hence causing a pulse to be generated sooner, producing a larger firing angle in order to pass more AC through the triac D12.

When capacitor C8 has no potential thereacross, indicating that core 284 is in its center position, transistor Q14 has a large internal resistance sufficient to prevent capacitor C4 from being charged to fire unijunction 213 during the half cycle of clipped AC. As the potential of clipped AC returns to zero volts at the end of the half cycle, the residual charge on capacitor C4 exceeds the percentage of potential across the base electrodes of unijunction transistor Q13, causing the unijunction to fire. This generates a pulse which gates triac D12 on, but has no effect since the AC voltage across the triac is zero volts. Thus, each 120th of a second, the unijunction transistor discharges capacitor C4, thereby synchronizing the operation of the control with the AC source for the motor 108.

As the voltage across capacitor C8 increases, the resistance of transistor Q14 decreases, causing the capacitor C4 to charge more rapidly and exceed the firing potential for unijunction Q13 prior to the zero or cross-over point of the half cycle of AC voltage. This causes the firing angle of triac D12 to advance in proportion to the magnitude of voltage across capacitor C8.

The deadband of the channel is controlled by the resistance of potentiometers R31 and R33. For example, as the total resistance of potentiometer R33 is increased, the sensitivity of the channel is decreased. As a result, a greater magnitude of voltage across capacitor C8 is necessary to maintain the same rate of charge of capacitor C4. Thus, a greater magnitude of control signal at capacitor C8 is necessary before the firing angle of the triac D12 will be advanced. This operation has effectively increased the deadband of the system. Control of the deadband is essential in order to adjust the level control for the particular motor being controlled and adjust for other variables that occur in the system.

The opposite channel, including unijunction transistor Q12 and triac D11, operates in substantially the same manner as the operation just described for the first channel. When no control signals are developed across either capacitors C8 or C10, both capacitors C4 and C5 are simultaneously discharged at the crossover time of each half cycle of AC, thereby generating a pair of pulses which gate triacs D12 and D11 conductive at the same time. The simultaneous gating of both triacs occurs at the time of zero voltage difference across the armature coil, resulting in no motor movement. As core 284 moves off center in a given direction, the voltage across one of the differential capacitors C8 or C10 will increase, thereby causing the time constant of its associated capacitor C4 or C5 to decrease. This in turn will advance the time at which a pulse is generated by its associated unijunction transistor, causing the firing angle of either triac D12 or D11 to advance, while the firing angle of the opposite triac remains at 0°.

In an exemplary embodiment, the pendulum detecting circuitry 283 and the sensitivity circuitry 285 detect an out of level condition of 0.003 inches over a 42 inch lane width. In this manner the pendulum level detector circuit and the sensitivity circuit 285 maintain an accurate level of the cutter carriage frame 18 and assure level machining of the bowling lane.

As the cutter carriage approaches the tail plank, which is the pit end of the lane, the skid switch 46 (FIG. 12) will close energizing relay R3 which in turn closes contacts R3—1 and holding line 300 maintaining relay R3 energized. Relay R3 closes contacts R3—2 in line 302 energizing time delay relay TDR1, which is a 2 second relay, and time delay relay TDR2, which is a 4 second relay. The contacts TDR1—1 and R2—3 in holding line 304 maintain the time delay relays 1 and 2 energized even though the skid switch 3 may be thereafter actuated.

With the energization of relay R3, contacts R3—2 immediately energize brake solenoid 306 in line 307 energizing brake 225, locking eccentric 210 in position and preventing pivotal movement of the cutter carriage about the skid assembly 24. During this time the carriage travel motor 33 continues to drive the drive unit and cutter carriage 12 for a period of 2 seconds after the actuation of skid switch 46. This permits a sufficient time for the cutter 14 to pass over the tail plank and completely resurface the lane 80 all the way to the pit end.

After this two second interval has elapsed, contacts TDR1—2 in line 310 will close energizing relays R4, R5 and R8. With the energization of relay R4 normally closed contacts R4—1 open, opening holding line 238 and dropping off relay R1, thereby deenergizing the cutting motors 29 and 30. At the same time, relay contacts R4—2 in line 310 energize relay RCW through normally closed contacts TDR2—2, diode D18, diode D15 and a normally closed limit switch 314 which is positioned adjacent cam 145.

Prior to the time the relay RCCW has been deenergized because of the opening of the normally closed contacts R3—3 when the skid switch 46 was actuated, the energization of relay RCW closes contacts RCW1 in line 316 maintaining the energization of winding 261 and the closure of contacts RCW2 in line 318 reversely energizes line winding 277 through contacts RCW3 in line 319, thus reversely rotating the depth of cut motor 142, raising the rear end of the carriage frame 18 and raising cutter 14 away from the lane. Note that the cutter frame assembly actually pivots about 203 (FIG. 2) in these conditions since the linkage assembly 44 is now locked. Limit switch 314 is positioned so that it is actuated by cam 145 when the cutter is in its withdrawn position. Upon actuation of switch 314 relay RCW will be deenergized, opening its contacts and deenergizing the depth of cut motor 142.

Also, at the end of this initial 2 second delay from actuation of switch 46, relay R5 opens the normally closed contacts R5—1 and closes the normally open contacts R5—1, deenergizing travel motor 33 and preparing the circuit for reversal. The carriage drive is thus stopped. At the same time relay R8 opens the normally closed contacts R8—1 in line 322.

After an additional two second delay, normally open contacts TDR2—1 in line 325 are closed energizing relay R6. Relay R6 closes contacts R6—1 which are normally open in line 326 and R6—2 in line 327 thereby energizing the start winding 250 through lines 328, 330, 326 and 255; and the run winding through lines 352, 327, contacts R5—2 and line 331, winding 251, line 333, relay R5—1 and lines 326 and 255. The resulting reversal in current through winding 251 reverses the travel motor 33 initiating operation of the drive unit 16 back toward the foul line pulling along with it the cutter carriage assembly 12.

The travel motor 33 may be stopped by depressing switch SW4 which deenergizes relay R2, opening contacts R2—1 and R2—2, deenergizing travel motor 33.

The control circuit 230 has several additional functions. A stop switch SW2 is provided in holding line 238 for manually interrupting operation of the cutting motors 29 and 30 at any desired time. Moreover, motor thermostats are provided associated with each of the cutting motors and when overheated open the normally closed contacts 340 and 341 in the holding line 238 deenergizing relay R1 and shutting off the cutting motors 28 and 30.

The travel motor stop switch SW4 permits the operator to stop the cutter carriage drive at any time even during the resurfacing stroke of the apparatus. The travel motor control switch SW5 has an off position as well as a reverse position to permit reversal of the driving unit at any time during the resurfacing cycle.

Moreover, the depth of cut motor control switch SW7 has off and manual positions and when placed in the manual position permits jog switch SW6 to be manually operated to selectively forwardly or reversely rotate the depth of cut motor 142 as desired.

The limit switch SW6 shown in FIG. 6 as well as FIG. 13 in line 355 deenergizes the level control motor 108 when actuated to limit extent of the level control assembly by motor 108. Moreover, a manually operable switch SW10 is provided to override limit switch SW6 to extend the possible range of level adjustment where necessary.

I claim:

1. A lane resurfacing assembly, comprising: frame means having first and second spaced support means for supporting the frame means over the lane to be resurfaced, lane resurfacing means carried by said frame means, one of said support means including a lane engaging assembly extending laterally with respect to said frame means, said lane engaging assembly including first eccentric means for varying the vertical distance of the lane engaging position of the lane engaging assembly to vary the depth of the lane resurfacing means, and second eccentric means substantially coaxial with respect to said first eccentric means for tilting a portion of the supporting assembly and the lane resurfacer.

2. A lane resurfacing assembly as defined in claim 1, wherein said first eccentric means includes two laterally spaced eccentrics having geometric axes, said geometric axes being coaxial, and means for simultaneously rotating said eccentrics about an axis of rotation spaced from said geometric axes.

3. A lane resurfacing assembly as defined in claim 1, wherein said second eccentric means includes spaced eccentrics having opposed geometric axes, and means for simultaneously rotating said spaced eccentrics about an axis of rotation skewed with respect to said common axes.

4. A lane resurfacer assembly, comprising: frame means, support means for said frame means for supporting said frame means over the lane to be resurfaced, lane resurfacing means supported on said frame means, and means for tilting said lane resurfacing means with respect to said lane including spaced eccentrics mounted in said frame means having opposed geometric axes, and means for rotating said eccentrics about an axis apart from said opposed axes.

5. A lane resurfacer assembly as defined in claim 4, wherein said eccentrics define part of the support means.

6. A lane resurfacer assembly as defined in claim 4, including a second pair of eccentrics for raising and lowering said lane resurfacing means.

7. A lane resurfacer assembly as defined in claim 6, wherein said second pair of eccentrics have a common geometric axis and means for rotating said common geometric axes of the second pair of eccentrics about an axis parallel to and spaced from the common axis thereof.

8. A lane resurfacing assembly, comprising: frame means, first support means for said frame means at the forward end thereof and having lane engaging means, second support means for said frame means at the rear end thereof, a rotating cutter mounted for rotation between said support means, said second support means having laterally spaced lane engaging means and having means for selectively and simultaneously raising and lowering the second lane engaging means to tilt the cutter and determine the cutter height, said second support means including a first shaft mounted for rotation on said frame means, a first pair of eccentrics mounted on said first shaft and having opposed geometric axes, the geometric axes of the first eccentrics being offset with respect to the axis of rotation of the shaft, means for simultaneously rotating the shaft and the first eccentrics to raise one of the lane engaging means and to lower the other to tilt the cutter, a second pair of eccentrics surrounding said shaft and having a common geometric axis, said second pair of eccentrics being mounted for rotation about the shaft, and means for simultaneously rotating said second pair of eccentrics about the geometric axis of the first pair of eccentrics to vary the cutter height.

9. A lane resurfacing assembly as defined in claim 8, wherein said shaft has spherical bearings at each end thereof on said first eccentrics and supported in said frame means.

10. A lane resurfacing assembly as defined in claim 8, including a rigid sleeve interconnecting the second pair of eccentrics, cutter height control means for rotating said rigid sleeve.

11. A lane resurfacing assembly as defined in claim 8, including a cutter level control motor for rotating said shaft.

12. A lane resurfacing assembly as defined in claim 8, wherein said second support means and lane engaging means includes a pair of lane engaging skids each supported on one of the pair of second eccentrics.

13. A lane resurfacer for a bowling lane, comprising: frame means, lane resurfacing means supporting on said frame means, means for supporting said frame means over a lane to be resurfaced, drive means for said frame means, travel motor means for said drive means, motor means for said resurfacing means, and automatic control means for the lane resurfacer including means for initiating operation of said travel motor means, means to initiate operation of said resurfacing motor means, switch means responsive to the position of the lane resurfacer at the pit end of the lane for reversing the travel motor means and terminating operation of the resurfacing motor so that the lane resurfacer automatically returns toward the foul line, and means responsive to said switch means for raising the resurfacing means from the lane after the resurfacing means has passed over the tail plank of the lane.

14. A lane resurfacer as defined in claim 13, wherein said switch means is mounted upon said frame means and is engageable with the surface of the lane.

15. A lane resurfacer as defined in claim 13, including means for raising and lowering the resurfacing means with respect to the lane, and means responsive to one of said initiating means for automatically lowering the lane resurfacing means a predetermined depth into the lane to be resurfaced.

16. A lane resurfacer as defined in claim 13, wherein said switch means includes sensing means for determining the location of the resurfacing means from the pit end of the lane, means responsive to a first predetermined time delay from actuation of said sensing means for terminating operation of said travel motor means and said resurfacer motor means, and means responsive to a longer predetermined time delay from deactuation of said travel motor means for reversing said travel motor means.

17. A lane resurfacer as defined in claim 13, including means for tilting the lane resurfacing means, level detecting means for detecting the level of the frame means, and means responsive to said detecting means for controlling said means for tilting the lane resurfacing means with respect to the lane.

18. A lane resurfacer as defined in claim 17, including manually operable switch means for initiating operation of said level detecting and control means.

19. A lane resurfacing assembly for resurfacing a bowling lane, comprising: frame means, lane resurfacing means supported on said frame means, means slidably supporting said frame means over a lane to be resurfaced, drive means for said frame means, travel motor means for said drive means, motor means for said resurfacing means, and automatic control means for the lane resurfacer, including means for moving the resurfacing means vertically to control the cutting depth, depth control motor means for said depth moving means, and control means for automatically lowering said resurfacing means to a predetermined depth with respect to the lane to be resurfaced.

20. A lane resurfacing assembly as defined in claim 19, including travel motor means for said frame means to move the frame means down a lane, means for initiating operation of said travel motor means, and means responsive to said travel motor means for initiating said resurfacer depth control means.

21. A lane resurfacing assembly as defined in claim 19, including sensing means for sensing the completion of resurfacing at the pit end of the lane, and means responsive to said sensing means to actuate said depth control means to retract the lane resurfacing means away from the lane a predetermined distance.

22. A lane resurfacing assembly as defined in claim 19, including manually actuable switch means for controlling the depth of cut of the lane resurfacing means.

23. A lane resurfacer assembly for a bowling lane, comprising: a cutter carriage having a rotatable cutter supported thereon, means for supporting said cutter carriage for movement along the lane to be resurfaced, cutter drive motor means on said cutter carriage for rotation of the cutter, means for vertically adjusting the cutter to determine the depth of cut including a depth control motor, means for adjusting the level of the cutter including a cutter level control motor, a travel drive unit supported independently of said cutter over the lane to be resurfaced, travel motor means on said travel unit for propelling the unit, means pivotally interconnecting the travel unit to the cutter carriage, means selectively connecting the travel unit to the cutter carriage to support the cutter carriage as it resurfaces the pit end of the lane, and control means for said lane resurfacer including means for initiating operation of said travel motor, means for initiating operation of said cutter motor, means responsive to initiation of unit travel motor for controlling said depth control motor, means for sensing the level of the cutter carriage and controlling the level motor in response thereto, switch means for sensing the position of said cutter carriage at the end of the lane, means responsive to said switch means for actuating the means for connecting the travel unit to the cutter carriage, means responsive to a predetermined time delay after the actuation of said switch means for terminating operation of said travel motor, said cutter drive motor controlling the cutter depth motor to withdraw the cutter, means responsive to a larger predetermined time delay from said switch means for reversing said travel motor to drive the travel unit and cutter carriage toward said foul line, and means for terminating operation of said travel motor.

\* \* \* \* \*